United States Patent
Kao et al.

(10) Patent No.: US 8,082,386 B2
(45) Date of Patent: Dec. 20, 2011

(54) METHOD OF PERFORMING WEAR LEVELING WITH VARIABLE THRESHOLD

(75) Inventors: Yu-Mao Kao, Hsinchu (TW); Yung-Li Ji, Hsinchu (TW); Chih-Nan Yen, Hsinchu (TW); Fuja Shone, Hsinchu (TW)

(73) Assignee: Skymedi Corporation, Science Park, Hsinchu (TW)

( * ) Notice: Subject to any disclaimer, the term of this patent is extended or adjusted under 35 U.S.C. 154(b) by 613 days.

(21) Appl. No.: 12/255,633

(22) Filed: Oct. 21, 2008

(65) Prior Publication Data

US 2010/0100663 A1    Apr. 22, 2010

(51) Int. Cl.
    G06F 12/02    (2006.01)
(52) U.S. Cl. .............. 711/103; 711/165; 711/E12.008
(58) Field of Classification Search ............. None
    See application file for complete search history.

(56) References Cited

U.S. PATENT DOCUMENTS

| | | | |
|---|---|---|---|
| 6,000,006 A * | 12/1999 | Bruce et al. | 711/103 |
| 7,903,486 B2 * | 3/2011 | Danilak | 365/201 |
| 2006/0106972 A1 * | 5/2006 | Gorobets et al. | 711/103 |
| 2007/0050536 A1 * | 3/2007 | Kolokowsky | 711/103 |
| 2008/0140918 A1 * | 6/2008 | Sutardja | 711/103 |
| 2008/0239811 A1 * | 10/2008 | Tanaka | 365/185.11 |
| 2008/0282025 A1 * | 11/2008 | Biswas et al. | 711/103 |

OTHER PUBLICATIONS

Microsoft Computer Dictionary, 2002, Microsoft Press, 5th ed., p. 510.*

Yuan-Hao Chang, Jen-Wei Hsieh, and Tei-Wei Kuo. 2007. Endurance enhancement of flash-memory storage systems: an efficient static wear leveling design. In Proceedings of the 44th annual Design Automation Conference (DAC '07). ACM, New York, NY, USA, 212-217. DOI=10.1145/1278480.1278533 <http://doi.acm.org/10.1145/1278480.1278533>.*

* cited by examiner

*Primary Examiner* — Pierre-Michel Bataille
*Assistant Examiner* — Ralph A Verderamo, III
(74) *Attorney, Agent, or Firm* — Winston Hsu; Scott Margo

(57) ABSTRACT

A wear leveling limit and/or an overall erase count threshold used for activating wear leveling in a non-volatile memory may be adjusted by determining a stage according to a highest erase count, and determining the wear leveling limit and/or the overall erase count threshold corresponding to the stage. Wear leveling may then be performed according to the wear leveling limit and/or the overall erase count threshold.

17 Claims, 7 Drawing Sheets

METHOD OF PERFORMING WEAR LEVELING WITH VARIABLE THRESHOLD

BACKGROUND OF THE INVENTION

1. Field of the Invention

The present invention relates to wear leveling methods for non-volatile memory devices, and more particularly, to a method of performing wear leveling that employs a variable threshold.

2. Description of the Prior Art

Non-volatile memory it typically organized in units of erasable blocks. Before performing a writing operation on a block, the block must first be erased before the block may be written to. However, a number of times each block may be erased is not infinite, but has an upper limit. Thus, products that utilize the non-volatile memory as a storage medium may employ a "wear leveling" mechanism to ensure that the number of erase operations performed does not differ too drastically across all blocks of the memory. However, wear leveling also requires moving data from frequently erased blocks to less erased blocks, which takes up erase count, and also lowers system performance.

Please refer to FIGS. 1 and 2, which is are diagrams illustrating non-volatile memory blocks/banks without wear leveling (FIG. 1) and with wear leveling (FIG. 2). Wear leveling mechanisms are aimed at distributing erase operations evenly over all blocks of a non-volatile memory, so as to extend life of the non-volatile memory (and thus an electronic device using the non-volatile memory) by increasing length of time it takes for a block that has been erased the most times to reach the upper limit on number of erase operations performed. In practice, information on how many times each block has been erased may be stored. Or, the blocks may be grouped into banks, each bank comprising multiple blocks, and average number of erase operations performed or total erase operations performed for each bank may be stored. In other words, each bank may comprise an arbitrary number of blocks. Wear leveling, then, may be triggered when a difference (Delta) of a greatest number of erase operations and a least number of erase operations exceeds a threshold. Or, wear leveling may be triggered once every certain number $W_{th}$ of write operations performed. When the wear leveling mechanism is activated, data from blocks with relatively high erase count may be exchanged with data from blocks with relatively low erase count, so as to reduce the difference Delta between the block(s)/bank(s) with the highest erase count and the block(s)/bank(s) with the lowest erase count.

Regardless of how the wear leveling mechanism is activated, the non-volatile memory utilizing the wear leveling mechanism described above may effectively reduce the difference of the block(s)/bank(s) with the highest erase count and the block(s)/bank(s) with the lowest erase count to within a wear leveling limit WLDelta, as shown in FIG. 2. By increasing how often data is exchanged between the blocks/banks with high erase count and the blocks with low erase count, the wear leveling limit WLDelta may be made even tighter. Frequency exchange of data, however, reduced transmission performance. Even more important, each exchange of data represents an increase in overall erase count, which reduces product lifetime.

SUMMARY OF THE INVENTION

According to an embodiment of the present invention, a method of performing wear leveling comprises determining a stage according to a highest erase count, determining a wear leveling limit corresponding to the stage, and performing wear leveling according to the wear leveling limit.

According to another embodiment of the present invention, a method of performing wear leveling comprises determining a stage according to a highest erase count, determining an overall erase count threshold corresponding to the stage, and performing wear leveling according to the overall erase count threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
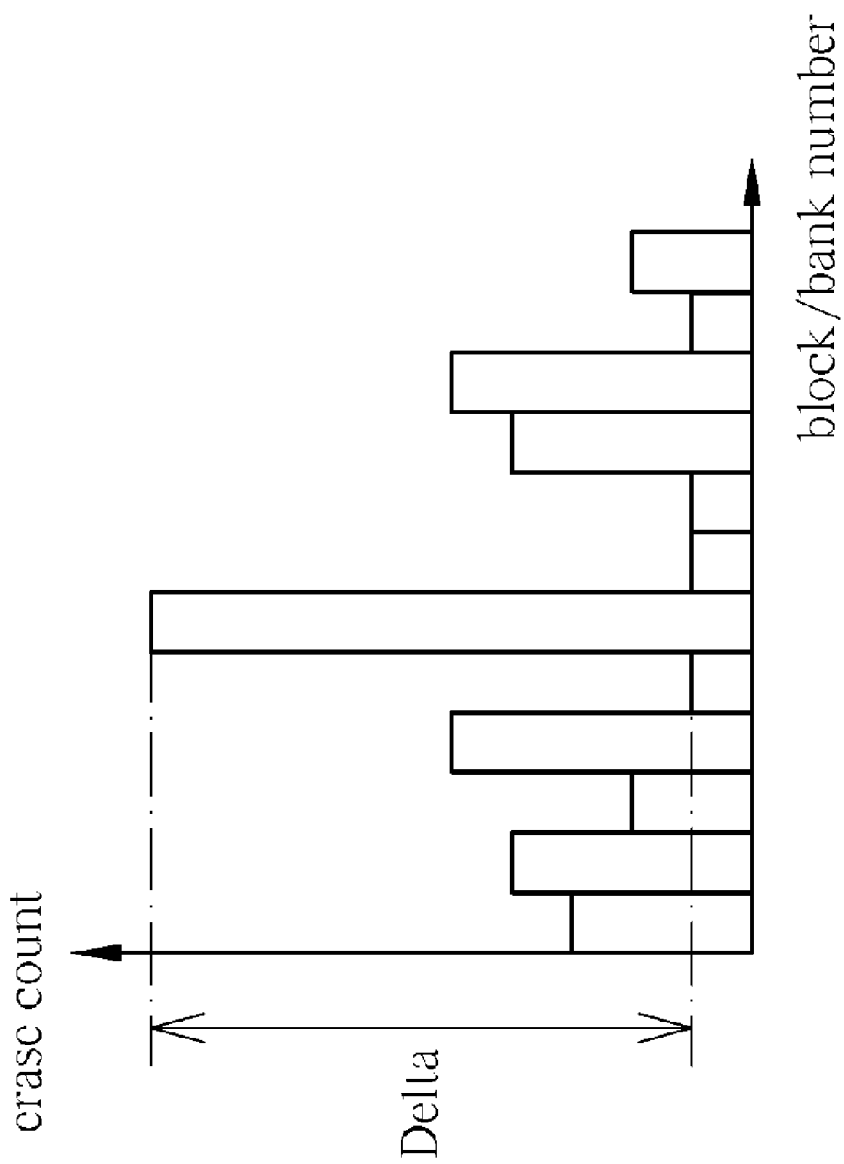
FIG. 1 is a diagram illustrating non-volatile memory blocks/banks without wear leveling.
Figure 2:
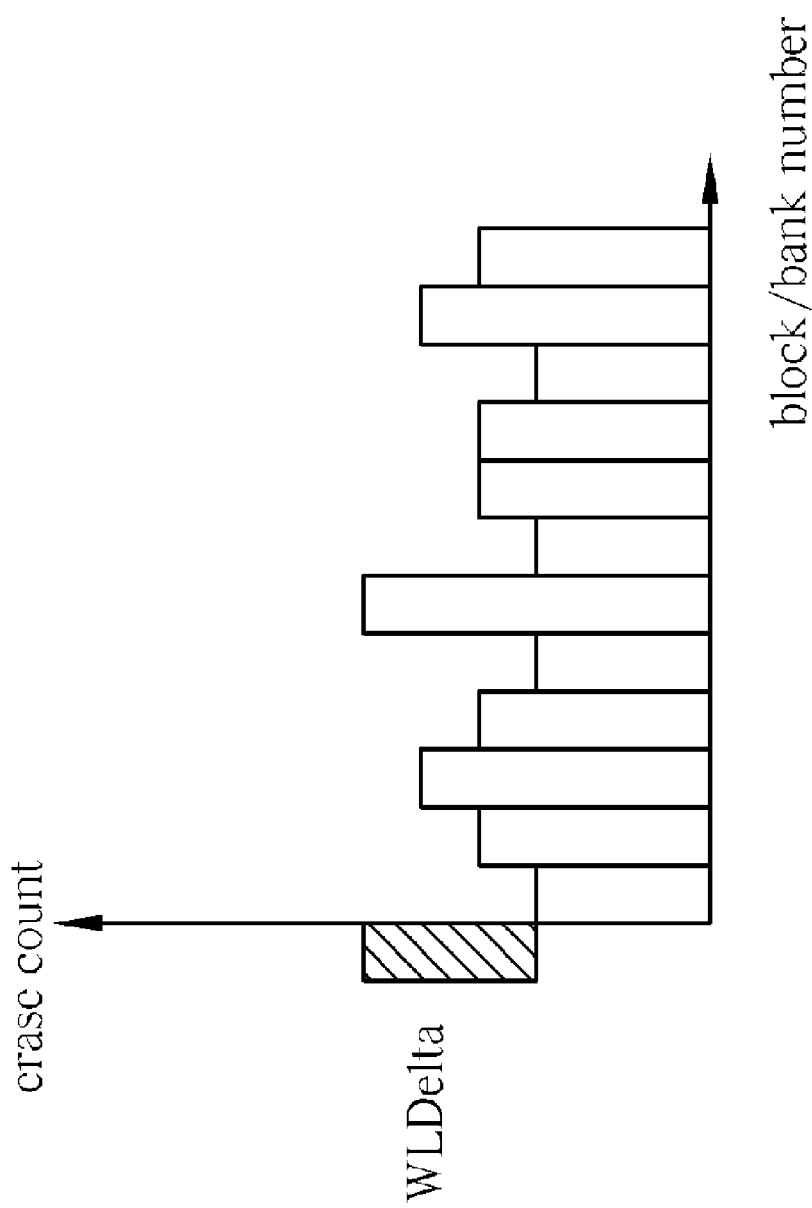
FIG. 2 is a diagram illustrating non-volatile memory blocks/banks with wear leveling.
Figure 3:
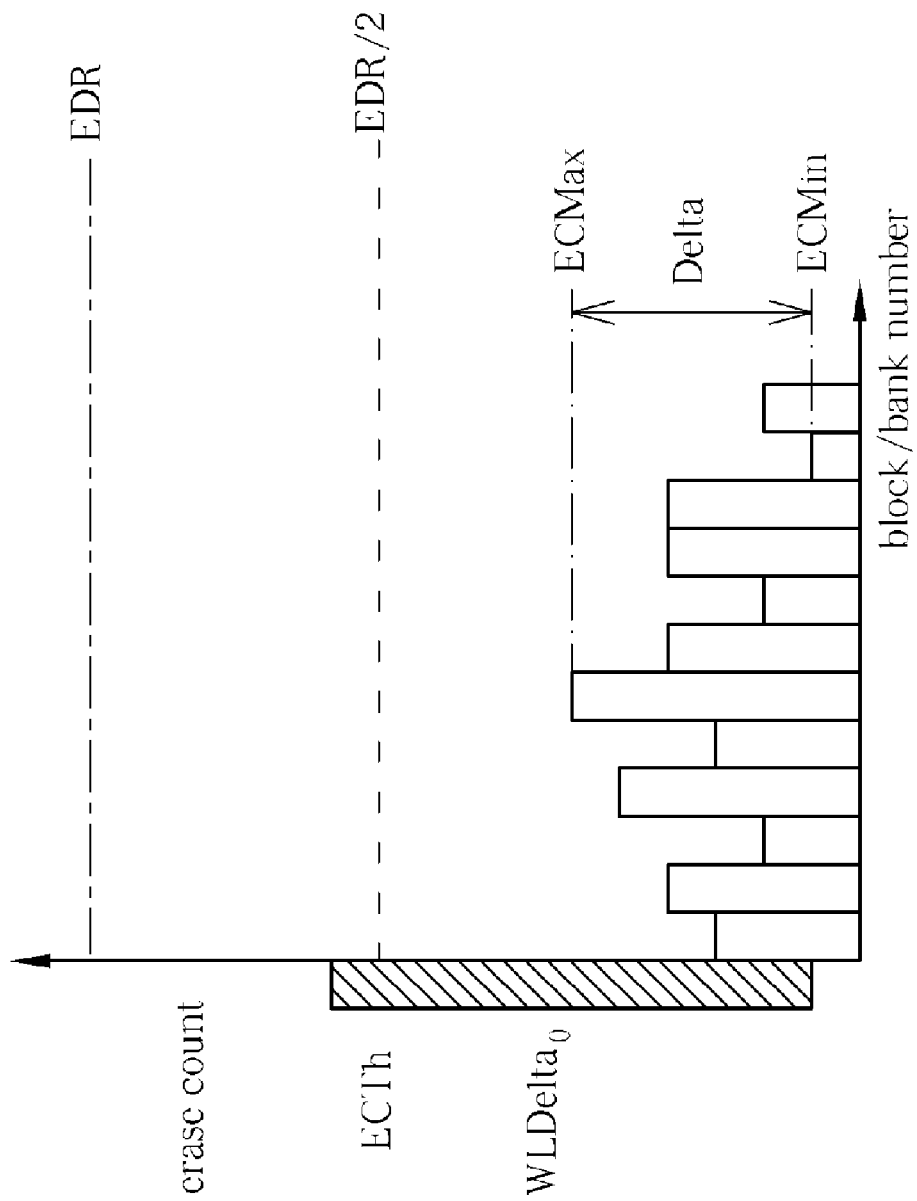
FIG. 3 is a diagram illustrating blocks/banks of non-volatile memory early in a life cycle of the non-volatile memory according to an embodiment of the present invention.

Please refer to FIG. 3, which is a diagram illustrating blocks/banks of non-volatile memory early in a life cycle of the non-volatile memory. As shown, near the beginning of the life cycle, the non-volatile memory has been used lightly. A wear leveling limit WLDelta may be set to an initial wear leveling limit $WLDelta_0$ according to characteristics of the non-volatile memory and product requirements. As shown in FIG. 2, a predetermined maximum erase/write count EDR may be set based on maximum number of erase/write operations each block/bank may withstand. Erase count of a block/bank that has been erased the greatest number of times of all the blocks/banks may be considered a highest erase count ECMax. Likewise, erase count of a block/bank that has been erased the least number of times of all the blocks/banks may be a considered lowest erase count ECMin. A difference Delta may be defined as a difference of the highest erase count ECMax and the lowest erase count ECMin. While the highest erase/write count ECMax is less than a erase count threshold ECTh, which may be equal to half the predetermined maximum erase/write count EDR (expressed as EDR/2), a wear leveling mechanism may perform wear leveling to keep the difference Delta within the initial wear leveling limit $WLDelta_0$.

Figure 4:
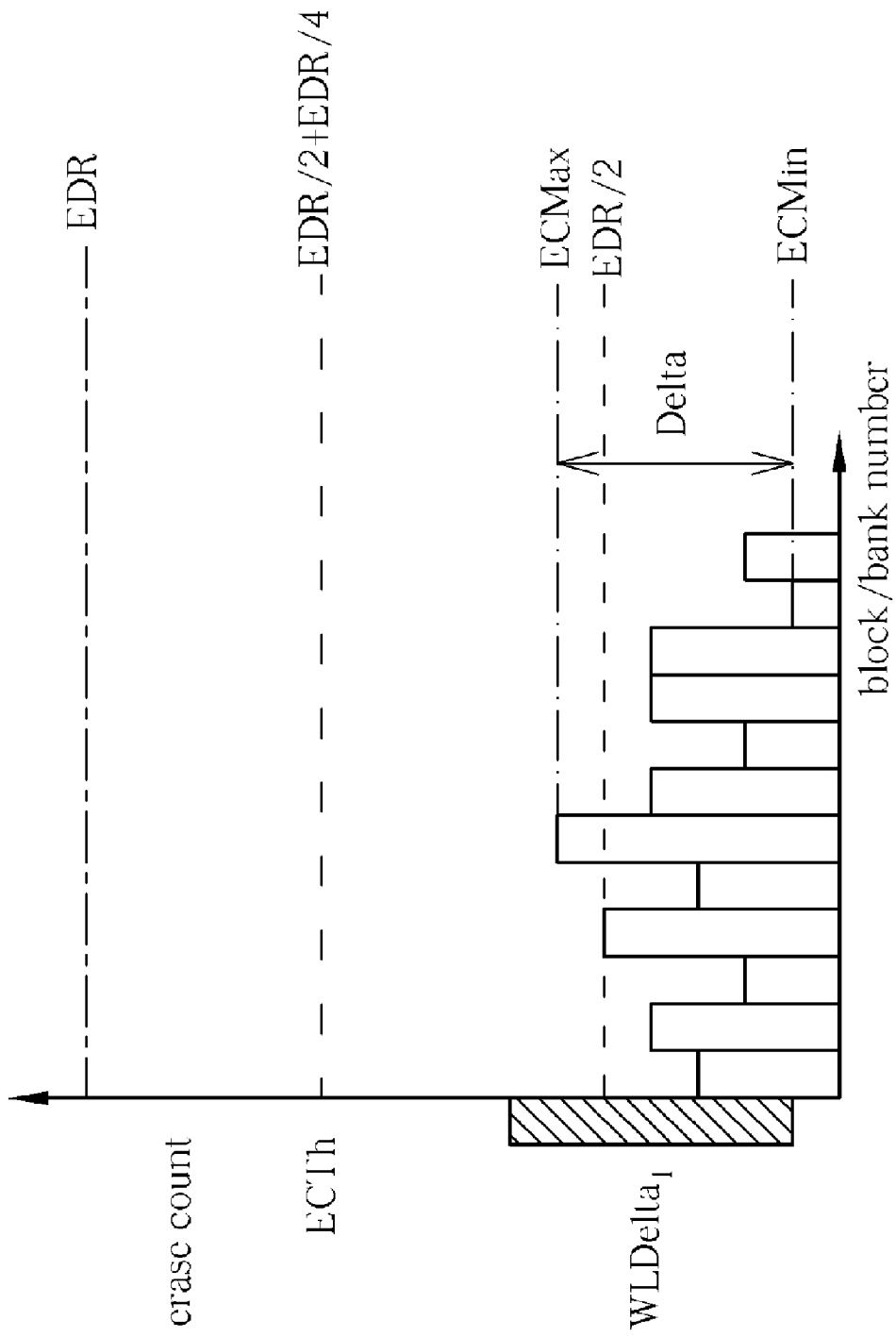
FIG. 4 is a diagram illustrating the blocks/banks of the non-volatile memory of FIG. 3 at a first stage.

Please refer to FIG. 4, which is a diagram illustrating the blocks/banks of the non-volatile memory at a first stage. As the non-volatile memory is utilized, the highest erase/write count ECMax may increase steadily. When the highest erase/write count ECMax reaches the erase count threshold ECTh, the wear leveling mechanism may adjust the wear leveling limit WLDelta to a first wear leveling limit $WLDelta_1$, which may be lower than the initial wear leveling limit $WLDelta_0$. The erase count threshold ECTh may also be increased, for example, to EDR/2+EDR/4. Frequency or strength of the wear leveling operation performed by the wear leveling mechanism may be increased so as to keep the difference Delta within the first wear leveling limit $WLDelta_1$. The first wear leveling limit $WLDelta_1$ may be maintained until the highest erase/write count ECMax reaches the erase count threshold ECTh of EDR/2+EDR/4.

Figure 5:
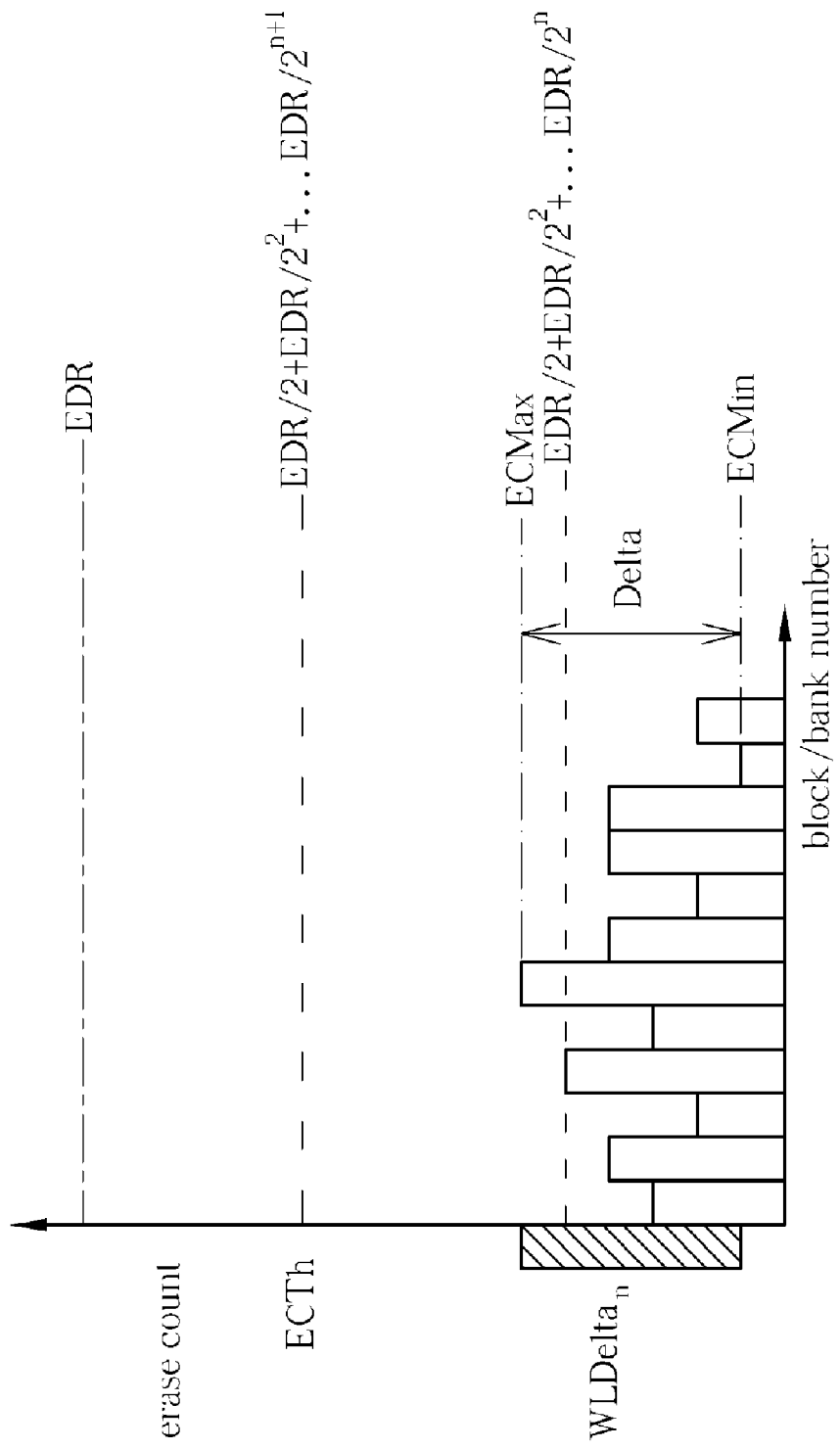
FIG. 5 is a diagram illustrating the blocks/banks of the non-volatile memory of FIG. 3 at a middle stage.
Figure 6:
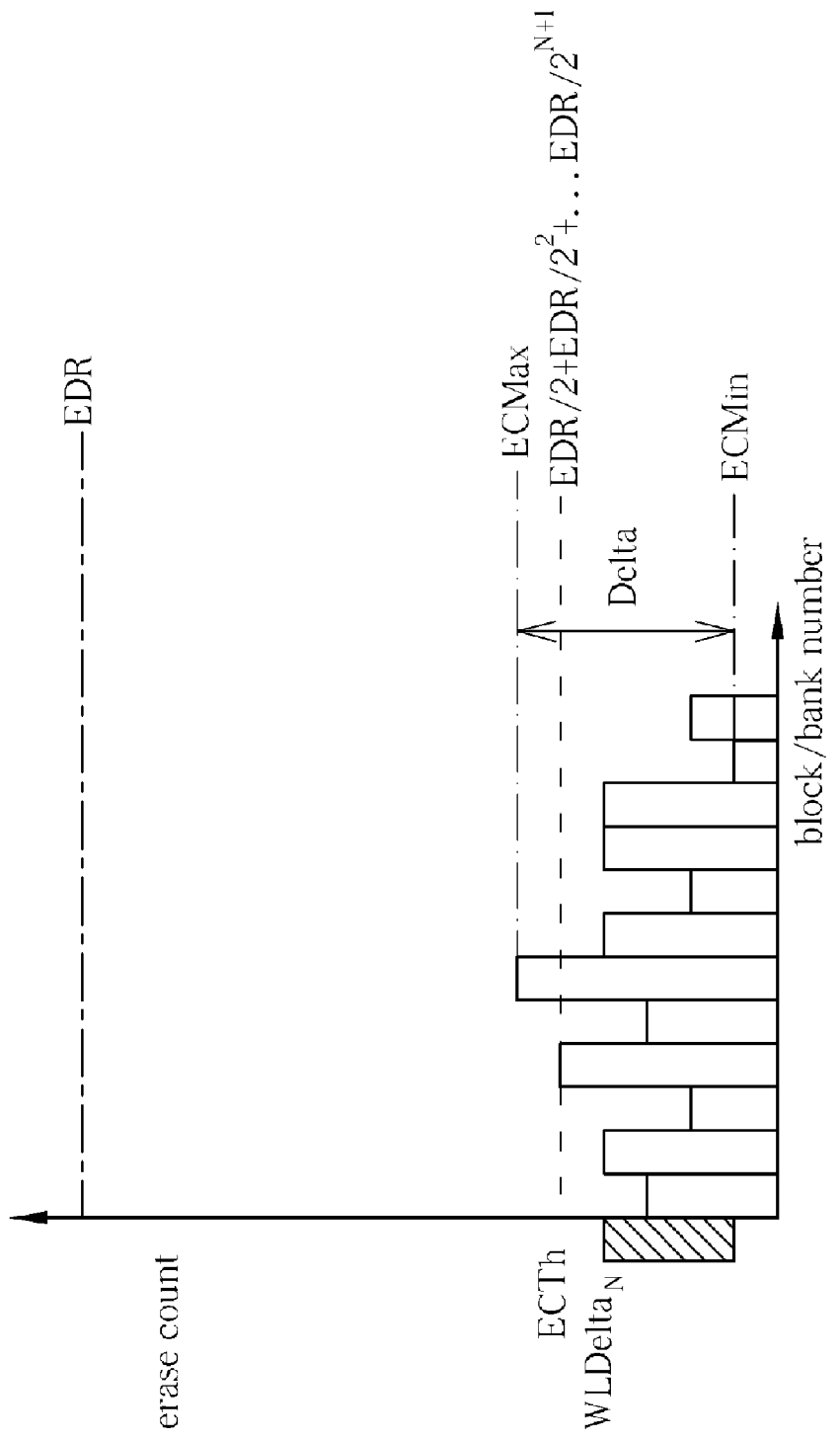
FIG. 6 is a diagram illustrating the blocks/banks of the non-volatile memory of FIG. 3 at a final stage.

Please refer to FIG. 5, which is a diagram illustrating the blocks/banks of the non-volatile memory at a middle stage. As the non-volatile memory is utilized further, the wear leveling limit WLDelta and the erase count threshold ECTh may be adjusted each time the highest erase/write count ECMax exceeds the erase count threshold ECTh. At an nth stage of operation, the wear leveling limit WLDelta may be reduced to an nth wear leveling limit $WLDelta_n$. Thus, the difference Delta between the highest erase/write count ECMax and the lowest erase/write count ECMin may be kept within the nth wear leveling limit $WLDelta_n$. At this point, the erase count threshold ECTh may be equal to $$EDR/2 + EDR/2^2 + \ldots + EDR/2^{n+1},$$

i.e. $\sum_{i=0}^{n} \frac{EDR}{2^{i+1}}$ or $\left[1 - \left(\frac{1}{2}\right)^{n+1}\right] EDR.$ Please refer to FIG. 6, which is a diagram illustrating the blocks/banks of the non-volatile memory at a final stage. The final stage may be an Nth stage of a predetermined number N of stages for adjusting the erase count threshold ECTh. As the non-volatile memory approaches the end of its lifespan, e.g. the erase count threshold ECTh approaches the predetermined maximum erase/write count EDR, the wear leveling limit WLDelta may be fixed at a final wear leveling limit $WLDelta_N$. At this point, even if the highest erase/write count ECMax exceeds the erase count threshold ECTh ($EDR/2 + EDR/2^2 + \ldots + EDR/2^{N+1}$), the wear leveling limit WLDelta may not be reduced further past the final wear leveling limit $WLDelta_N$, which may be utilized until the non-volatile memory dies, e.g. by reaching the predetermined maximum erase/write count EDR.

At the final stage, the non-volatile memory may notify a host device that the non-volatile memory is in the final stage corresponding to the end of its lifespan. In this way, a user of the host device may be given an opportunity to prevent damage to, or loss of, data due to the highest erase/write count ECMax exceeding the predetermined maximum erase/write count EDR.

Size of the predetermined number N may be determined according to characteristics of the non-volatile memory and type of the wear leveling mechanism employed, and is not limited. Likewise, the wear leveling limit WLDelta may also be adjusted according to the characteristics of the non-volatile memory and the type of the wear leveling mechanism employed. The wear leveling limit WLDelta may exhibit the following relationship:

$WLDelta_0 \geq WLDelta_1 \geq \ldots \geq WLDelta_n \geq \ldots \geq WLDelta_N.$ A ratio R may also be set as follows:

$$\frac{WLDelta_1}{WLDelta_0} = \frac{WLDelta_2}{WLDelta_1}$$

-continued $$= \frac{WLDelta_{n+1}}{WLDelta_n}$$

$$= \frac{WLDelta_N}{WLDelta_{N-1}}$$

$$= R.$$

Thus, the first wear leveling limit $WLDelta_1$ may be set to a product of the ratio R and the initial wear leveling limit $WLDelta_0$, and so forth for each successive wear leveling limit $WLDelta_2$-$WLDelta_N$. Of course, the method described above could also be utilized to modify an overall erase count threshold Wth, such that the wear leveling mechanism may perform wear leveling once each time overall erase count reaches the overall erase count threshold Wth. Then, for example, the overall erase count threshold Wth may be reduced over the lifespan of the non-volatile memory. In other words, initially, the overall erase count threshold Wth may be relatively high, such that wear leveling is performed relatively infrequently to keep the difference Delta within a relatively large wear leveling limit $WLDelta_0$. At the final stage, however, the overall erase count threshold Wth may be decreased, so that wear leveling is performed relatively frequently to keep the difference Delta within a relatively small wear leveling limit $WLDelta_N$. Thus, wear leveling in the embodiment described above may be controlled passively by modifying the wear leveling limit WLDelta, or actively by modifying the overall erase count threshold Wth. Expressed another way, wear leveling may be controlled on a micro level by modifying the wear leveling limit WLDelta, or on a macro level by modifying the overall erase count threshold Wth.

Figure 7:
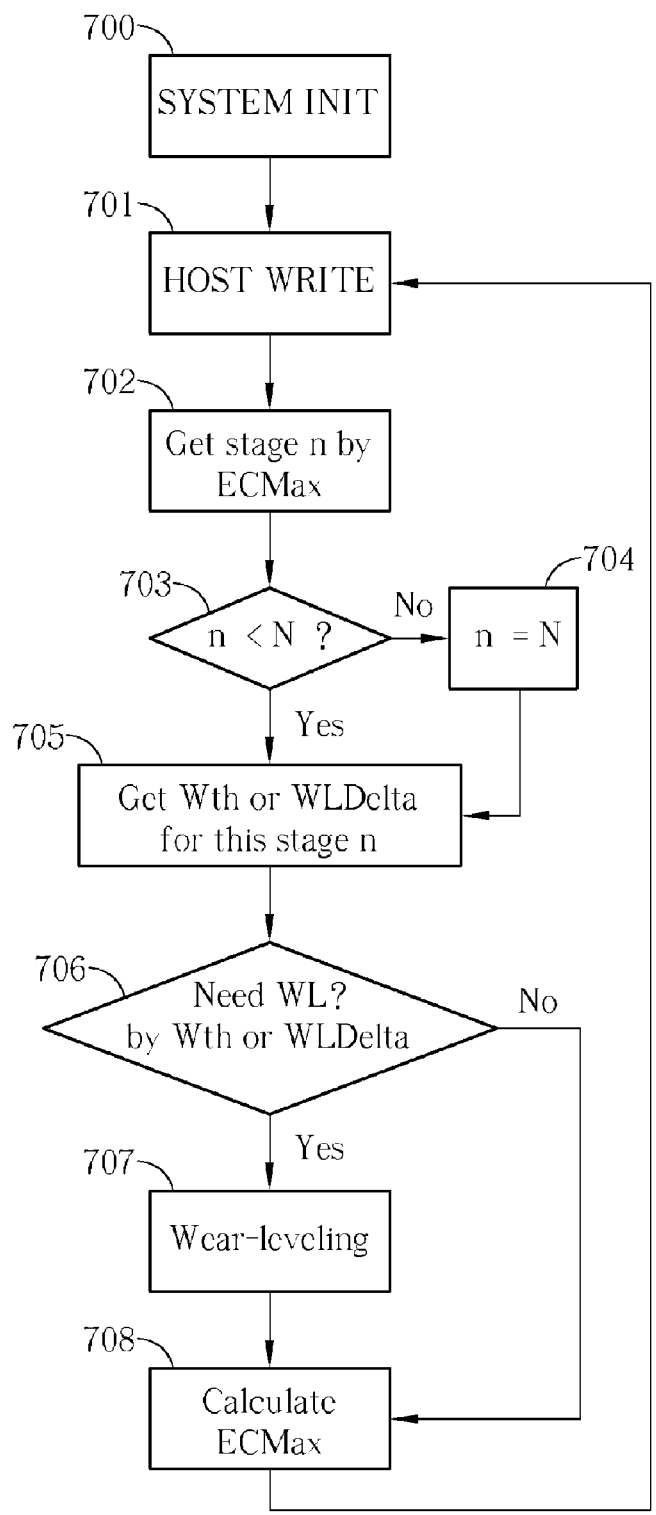
FIG. 7 is a flowchart of a process for performing wear leveling according to the embodiment of the present invention.

Please refer to FIG. 7, which is a diagram of a process 70 for performing wear leveling according to the embodiment described above. The process 70 may begin with system initialization (Step 700). After a writing operation by the host (Step 701), the stage n may be determined from the highest erase/write count ECMax (Step 703). If n is not less than N, then the stage n is determined to be the final stage N (Steps 704-705). The wear leveling limit WLDelta or the overall erase count threshold Wth may then be determined for the stage n (Step 706). Wear leveling may then be performed (Step 708) according to the overall erase count threshold Wth or the wear leveling limit WLDelta (Step 707). Regardless of whether or not wear leveling is performed, the highest erase/write count ECMax may then be calculated (Step 709). Once the highest erase/write count ECMax has been calculated (Step 709), another writing operation may be performed by the host (Step 701).

In Step 703, the stage n may be looked up in a table comprising values of the highest erase/write count ECMax and corresponding stages. Or, the stage n may be calculated from the highest erase/write count ECMax according to an algorithm. For example, for the relationship described above for the erase count threshold ECTh, the stage n may be expressed as:

$$n = \frac{\log(1 - ECMax/EDR)}{\log(1 - 1/2)}$$

rounded down to the nearest whole number. Thus, for any ECMax between 0.5*EDR and 0.75*EDR, n may be determined as 1. Another embodiment may store a current stage n, which may be updated to a next stage n+1 when the highest erase/write count ECMax exceeds the erase count threshold ECTh.

Likewise, in Step 706, the overall erase count threshold Wth may be looked up or calculated according to the stage n, and/or the wear leveling limit WLDelta may also be looked up or calculated according to the stage n. For example a table may comprise values of n and corresponding values of Wth and/or WLDelta. Or, for example, the ratio R may be used to calculate the wear leveling limit WLDelta$_n$ from a previous wear leveling limit WLDelta$_{n-1}$, e.g. by multiplying the previous wear leveling limit WLDelta$_{n-1}$ by the ratio R. The previous wear leveling limit WLDelta$_{n-1}$ may be stored.

From the standpoint of lifespan of the non-volatile memory as a storage medium, the embodiment of the present invention effectively reduces the negative effects caused by performing wear leveling. The embodiment of the present invention takes into account the expected lifespan of the non-volatile memory when configuring the wear leveling mechanism, using the expected lifespan to determine how frequently wear leveling should be performed according to the overall erase count threshold Wth or the wear leveling limit WLDelta. Thus, in early stages of use, the embodiment of the present invention allows the wear leveling limit WLDelta and/or the overall erase count threshold Wth to be larger, which reduces the amount of wear leveling operations performed on the blocks/banks in the early stages of use. By reducing the frequency and amount of wear leveling operations performed, the embodiment of the present invention increases transmission effectiveness and lifespan of the non-volatile memory.

Those skilled in the art will readily observe that numerous modifications and alterations of the device and method may be made while retaining the teachings of the invention.

What is claimed is:

1. A method of performing wear leveling, the method comprising:
   determining a stage according to a highest erase count;
   determining a wear leveling limit corresponding to the stage, wherein determining the wear leveling limit from the stage comprises determining the wear leveling limit from a previous wear leveling limit; and
   performing wear leveling according to the wear leveling limit.

2. The method of claim 1, wherein determining the stage according to the highest erase count comprises looking up the stage corresponding to the highest erase count in a table.

3. The method of claim 1, wherein determining the stage according to the highest erase count comprises calculating the stage from the highest erase count according to an algorithm.

4. The method of claim 3, wherein calculating the stage from the highest erase count according to the algorithm comprises calculating the stage according to a ratio of the highest erase count and a predetermined maximum erase count.

5. The method of claim 1, wherein determining the wear leveling limit corresponding to the stage comprises looking up the wear leveling limit corresponding to the stage in a table.

6. The method of claim 1, wherein determining the wear leveling limit corresponding to the stage comprises calculating the wear leveling limit from the stage according to an algorithm.

7. The method of claim 1, wherein determining the wear leveling limit from the previous wear leveling limit comprises determining the wear leveling limit as a product of the previous wear leveling limit and a ratio.

8. The method of claim 1, wherein performing wear leveling according to the wear leveling limit comprises performing wear leveling when the highest erase count is greater than a lowest erase count by the wear leveling limit.

9. A method of performing wear leveling, the method comprising:
   determining a stage according to a highest erase count;
   determining an overall erase count threshold corresponding to the stage, wherein determining the overall erase count threshold from the stage comprises determining the overall erase count threshold from a previous overall erase count threshold; and
   performing wear leveling according to the overall erase count threshold.

10. The method of claim 9, wherein determining the stage according to the highest erase count comprises looking up the stage corresponding to the highest erase count in a table.

11. The method of claim 9, wherein determining the stage according to the highest erase count comprises calculating the stage from the highest erase count according to an algorithm.

12. The method of claim 11, wherein calculating the stage from the highest erase count according to the algorithm comprises calculating the stage according to a ratio of the highest erase count and a predetermined maximum erase count.

13. The method of claim 9, wherein determining the overall erase count threshold corresponding to the stage comprises looking up the overall erase count threshold corresponding to the stage in a table.

14. The method of claim 9, wherein determining the overall erase count threshold corresponding to the stage comprises calculating the overall erase count threshold from the stage according to an algorithm.

15. The method of claim 9, wherein determining the overall erase count threshold from the previous overall erase count threshold comprises determining the overall erase count threshold as a product of the previous overall erase count threshold and a ratio.

16. The method of claim 9, wherein performing wear leveling according to the overall erase count threshold comprises performing wear leveling when an overall erase count equals the overall erase count threshold.

17. The method of claim 9, wherein performing wear leveling according to the overall erase count threshold comprises performing wear leveling when an overall erase count exceeds the overall erase count threshold.

* * * * *